(12) United States Patent
Tang et al.

(10) Patent No.: US 12,112,499 B2
(45) Date of Patent: Oct. 8, 2024

(54) ALGORITHM FOR MIX-SIZE DEPALLETIZING (71) Applicant: FANUC CORPORATION, Yamanashi (JP)

(72) Inventors: Te Tang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 269 days.

(21) Appl. No.: 17/456,977

(22) Filed: Nov. 30, 2021

(65) Prior Publication Data

US 2023/0169675 A1 Jun. 1, 2023

(51) Int. Cl.
G06T 7/73 (2017.01)
B25J 9/16 (2006.01)
G06T 7/12 (2017.01)
G06T 7/155 (2017.01)
G06T 7/33 (2017.01)
G06T 7/593 (2017.01)
G06V 10/34 (2022.01)
G06V 10/82 (2022.01)
G06V 20/64 (2022.01)

(52) U.S. Cl.
CPC ............... *G06T 7/73* (2017.01); *B25J 9/1697* (2013.01); *G06T 7/12* (2017.01); *G06T 7/155* (2017.01); *G06T 7/33* (2017.01); *G06T 7/593* (2017.01); *G06V 10/34* (2022.01); *G06V 10/82* (2022.01); *G06V 20/64* (2022.01); *G06T 2207/10012* (2013.01); *G06T 2207/10024* (2013.01); *G06T 2207/20036* (2013.01); *G06T 2207/20084* (2013.01)

(58) Field of Classification Search
CPC .. G06T 7/73; G06T 7/12; G06T 7/155; G06T 7/33; G06T 7/593; G06T 2207/10012; G06T 2207/10024; G06T 2207/20036; G06T 2207/20084; G06T 2207/10028; G06T 7/11; G06T 7/187; G06T 7/194; B25J 9/1697; B25J 9/1687; G06V 10/34; G06V 10/82; G06V 20/64; G05B 2219/40006; G05B 2219/40607
See application file for complete search history.

(56) References Cited

U.S. PATENT DOCUMENTS

| 6,456,899 B1 * | 9/2002 | Gleason | G03F 7/7065 |
| | | | 706/900 |
| 10,950,034 B1 * | 3/2021 | Garcia | G06T 7/11 |
| 11,321,864 B1 * | 5/2022 | El Dokor | G06F 3/04847 |

(Continued)

*Primary Examiner* — Nancy Bitar
*Assistant Examiner* — Dustin Bilodeau
(74) *Attorney, Agent, or Firm* — John A. Miller; Shumaker, Loop & Kendrick, LLP (57) ABSTRACT A system and method for identifying a box to be picked up by a robot from a stack of boxes. The method includes obtaining a 2D red-green-blue (RGB) color image of the boxes and a 2D depth map image of the boxes using a 3D camera. The method employs an image segmentation process that uses a simplified mask R-CNN executable by a central processing unit (CPU) to predict which pixels in the RGB image are associated with each box, where the pixels associated with each box are assigned a unique label that combine to define a mask for the box. The method then identifies a location for picking up the box using the segmentation image.

25 Claims, 7 Drawing Sheets (56) References Cited

U.S. PATENT DOCUMENTS

| | | | |
|---|---|---|---|
| 2020/0342586 A1* | 10/2020 | Kumar | G06T 7/136 |
| 2021/0004584 A1* | 1/2021 | Bildner | G06N 3/048 |
| 2022/0410381 A1* | 12/2022 | Stoppi | B25J 19/023 |
| 2023/0104262 A1* | 4/2023 | Lin | G06V 10/25 |
| | | | 382/173 |

* cited by examiner

ALGORITHM FOR MIX-SIZE DEPALLETIZING

BACKGROUND

Field

This disclosure relates generally to a system and method for identifying an object to be picked up by a robot from a group of objects and, more particularly, to a system and method for identifying a box to be picked up by a robot from a stack of boxes, where the method employs an image segmentation process that uses a simplified mask R-CNN or other neural network executable by a central processing unit (CPU) to predict a center area of the boxes and a traditional operation for identifying edges of the boxes around the center area.

Discussion of the Related Art

Robots perform a multitude of commercial tasks including pick and place operations, where the robot picks up and moves objects from one location to another location. For example, the robot may pick up boxes off of a pallet and place the boxes on a conveyor belt, where the robot likely employs an end-effector with suction cups to hold the boxes. In order for the robot to effectively pick up a box, the robot needs to know the width, length and height of the box it is picking up, which is input into the robot controller prior to the pick and place operation. However, often times the boxes on the same pallet have different sizes, which makes it inefficient to input the size of the boxes into the robot during the pick and place operation. The boxes can also be placed side-by-side at the same height, where it is challenging to distinguish whether they are separate boxes or a single large box.

In one known robot pick and place system, the width, length and height of the boxes the robot will be picking up is first input into the system. A 3D camera takes top down images of a stack of the boxes and generates 2D grey images of the boxes and 2D gray scale depth map images of the boxes, where each pixel in the depth map image has a value that defines the distance from the camera to a particular box, i.e., the closer the pixel is to the object the lower its value. A robot controller provides a series of projection templates based on the width and length of the boxes that each has a size for a certain distance between the camera and the boxes. The template for the distance of a box provided by the depth map image is moved around the 2D grey image in a search process so that when the template matches or aligns with the box in the grey image, the robot controller will know the location of the box, and will use that location to define a center of the box to control the robot to pick up the box.

U.S. patent application Ser. No. 17/015,817, filed Sep. 9, 2020, titled, Mix-Size Depalletizing, assigned to the assignee of this application and herein incorporated by reference, discloses a system and method for identifying a box to be picked up by a robot from a stack of boxes. The method includes obtaining a 2D red-green-blue (RGB) color image of the boxes and a 2D depth map image of the boxes using a 3D camera, where pixels in the depth map image are assigned a value identifying the distance from the camera to the boxes. The method employs a modified deep learning mask R-CNN (convolutional neural network) that generates a segmentation image of the boxes by performing an image segmentation process that extracts features from the RGB image and the depth map image, combines the extracted features in the images and assigns a label to the pixels in a features image so that each box in the segmentation image has the same label. The method then identifies a location for picking up the box using the segmentation image.

The method described in the '817 application has been shown to be effective for identifying a box in a stack of boxes for a robot to pick up. However, the method disclosed in the '817 application employs a deep learning neural network for an image filtering step, a region proposal step and a binary segmentation step. These types of deep learning neural networks require significant processing so that in order to have realistic and practical robot pick-up times, a graphics processing unit (GPU), which provides greater speeds over central processing units (CPU) generally because of parallel processing, is typically necessary to be used for the deep learning neural network computations. For example, by employing a CPU for the neural network processing in the '817 method, the process will take about 2.272 seconds to identify a box to be picked up, whereas using a GPU for the neural network processing in the '817 method, the process only requires about 0.1185 seconds. However, industrial applications, such as robotic systems, are currently not conducive for employing GPUs because of the standard protocols currently being used and the harsh environment that these systems are often subjected to.

SUMMARY

The following discussion discloses and describes a system and method for identifying a box to be picked up by a robot from a stack of boxes. The method includes obtaining a 2D red-green-blue (RGB) color image of the boxes and a 2D depth map image of the boxes using a 3D camera, where pixels in the depth map image are assigned a value identifying the distance from the camera to the boxes. The method generates a segmentation mask image of the boxes by performing an image segmentation process in a simplified mask R-CNN (convolutional neural network) executable by a central processing unit (CPU). The image segmentation process extracts features from the RGB image and uses the extracted features to predict which pixels in the RGB image are associated with each box, where the pixels associated with each box are assigned a unique label that combine to define a mask for the box. The method selects one of the masks in the segmentation mask image and identifies and removes pixels in the selected mask that may be associated with a lower box than the box associated with the mask to provide a refined mask. The method then generates a lower boundary mask and an upper boundary mask from the refined mask using a morphological process, and generates an expanded mask from the lower boundary mask and the upper boundary mask using a refinement process. The method then identifies a location for picking up the box using the expanded mask.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for identifying a box to be picked up by a robot from a stack of boxes, where the method employs an image segmentation process that uses a simplified mask R-CNN executable by a central processing unit (CPU) to predict which pixels in an RGB image are associated with each box, is merely exemplary in nature, and is in no way intended to limit the invention or its applications or uses. For example, the system and method have application for identifying a box to be picked up by a robot. However, the system and method may have other applications.

Figure 1:
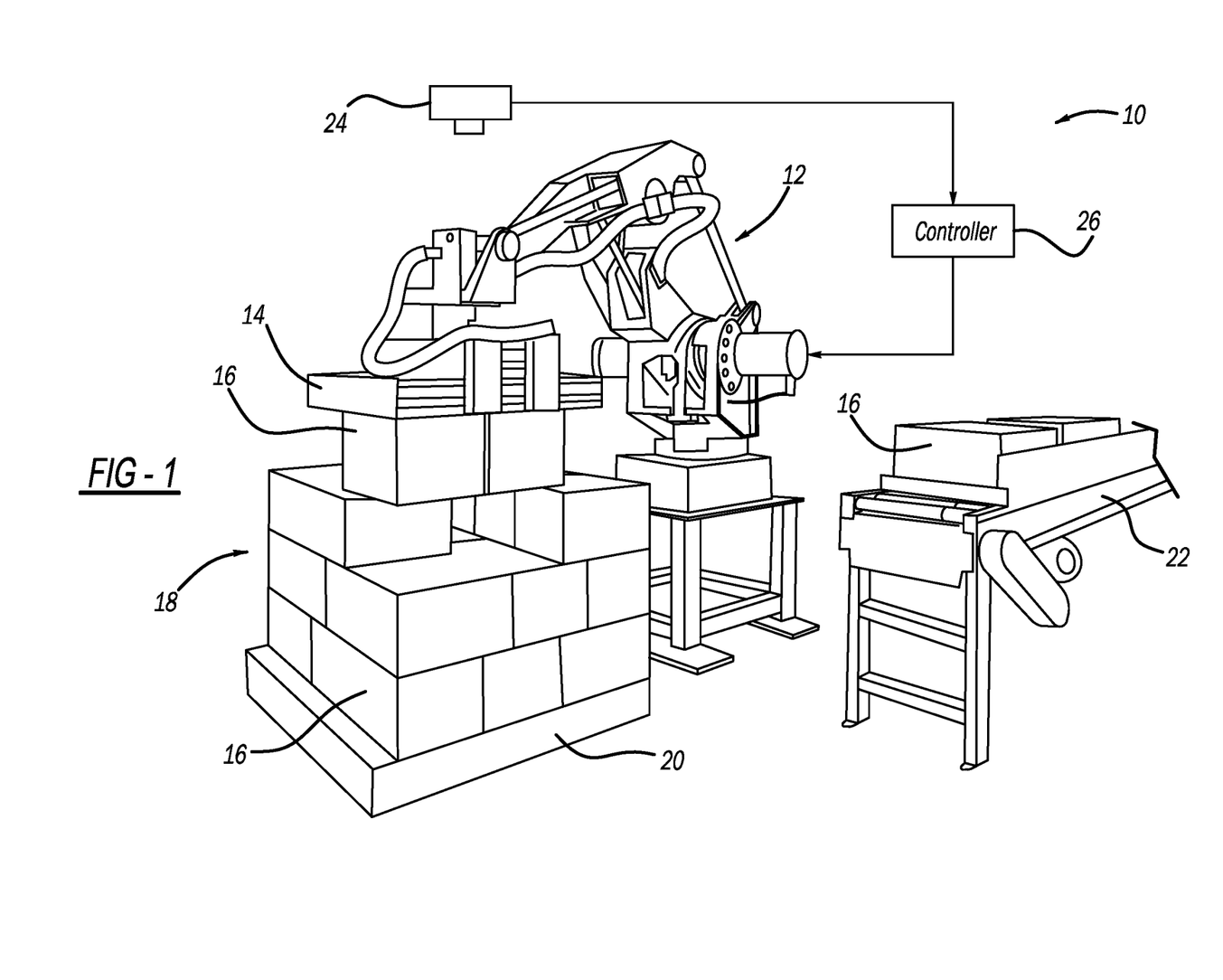
FIG. 1 is an illustration of a robot system including a robot picking up boxes off of a pallet and placing them on a conveyor belt.

FIG. 1 is an illustration of a robot system 10 including a robot 12 having an end-effector 14 that is configured for picking up boxes 16 from a stack 18 of the boxes 16 positioned on a pallet 20 and placing them on a conveyor belt 22. The system 10 is intended to represent any type of robot system that can benefit from the discussion herein, where the robot 12 can be any robot suitable for that purpose. A 3D camera 24 is positioned to take top down 2D RBG and depth map images of the stack 18 of the boxes 16 and provide them to a robot controller 26 that controls the movement of the robot 12. The boxes 16 may have different orientations on the pallet 20, may be stacked in multiple layers on the pallet 20 and may have different sizes.

As will be discussed in detail below, the robot controller 26 employs an algorithm that determines the size of each of the boxes 16 the robot 12 will be picking up without the length, width and height of the box 16 being previously input into the controller 26 and without the need to generate projection templates of the boxes 16. More specifically, the algorithm performs an image segmentation process that assigns a label to every pixel in an image such that the pixels with the same label share certain characteristics. Thus, the segmentation process predicts which pixel belongs to which of the boxes 16, where different indicia represent different boxes 16.

Modern image segmentation techniques often employ deep learning technology. Deep learning is a particular type of machine learning that provides greater learning performance by representing a certain real-world environment as a hierarchy of increasing complex concepts. Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output. Deep learning neural networks are often employed to provide image feature extraction and transformation for the visual detection and classification of objects in an image, where a video or stream of images can be analyzed by the network to identify and classify objects and learn through the process to better recognize the objects. Thus, in these types of networks, the system can use the same processing configuration to detect certain objects and classify them differently based on how the algorithm has learned to recognize the objects.

The number of layers and the number of nodes in the layers in a neural network determine the network's complexity, computation time and performance accuracy. The complexity of a neural network can be reduced by reducing the number of layers in the network, the number of nodes in the layers or both. However, reducing the complexity of the neural network reduces its accuracy for learning, where it has been shown that reducing the number of nodes in the layers has accuracy benefits over reducing the number of layers in the network. The '817 application employed a deep learning neural network to provide the segmentation that was a modified form of a deep learning mask R-CNN. This disclosure proposes using a smaller or compressed deep learning neural network for performing the segmentation process for identifying the location of a box to be picked up in the same manner as in the '817 application, referred to herein as a simplified mask R-CNN, so that a CPU can be used to perform the calculations and still have suitable computation times, for example, 0.528 seconds, for the robot 12. In one non-limiting embodiment, the size of the neural network is accomplished by decreasing the number of nodes in the layers by half. However, by reducing the number of nodes in the neural network, the ability of the neural network to accurately predict the location and orientation of the box 16 is significantly reduced, where the edges of the box 16 are difficult to predict. For example, the segmentation process would require the use of larger bounding boxes to ensure that the entire box 16 was identified in the image. Therefore additional processing steps are performed to more accurately identify the location of the box 16 being picked up by the robot 12.

Figure 2:
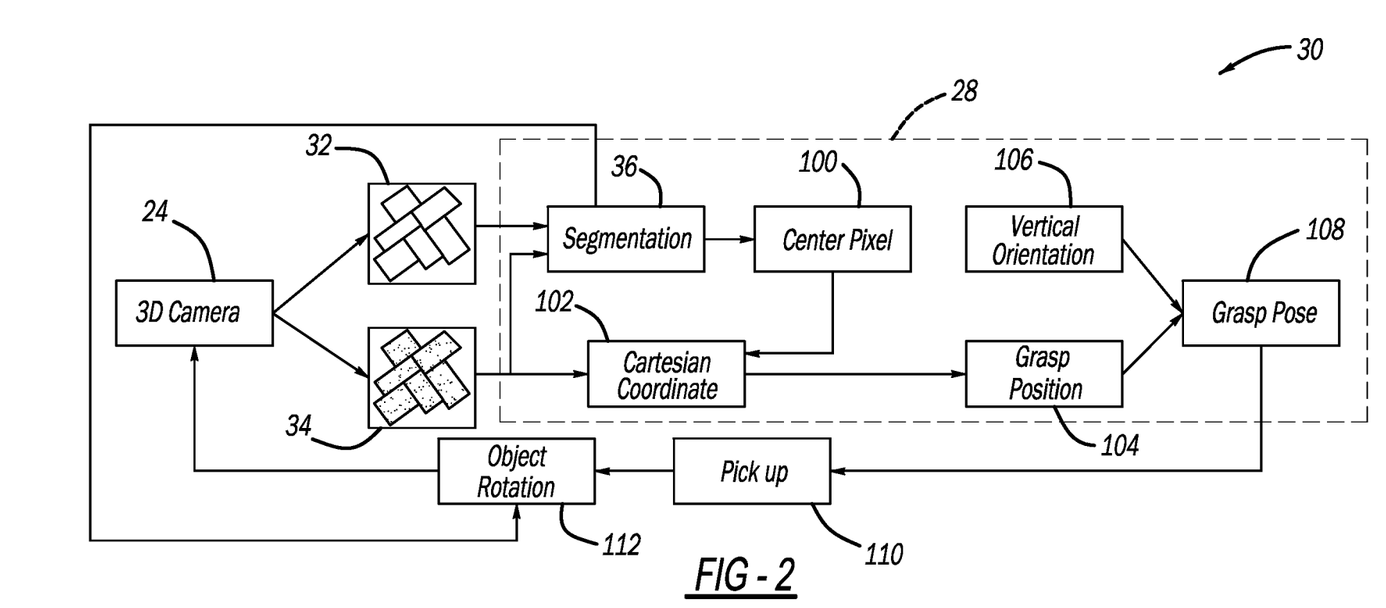
FIG. 2 is a schematic block diagram of a mix-size depalletizing system that is part of the robot system shown in FIG. 1.

FIG. 2 is a schematic block diagram of a mix-size depalletizing system 30 that is part of the controller 26 in the robot system 10 that operates to pick up the boxes 16 off of the pallet 20, where the system 30 includes a CPU 28 that performs the computations. The system 30 receives a 2D RGB image 32 of a top view of the boxes 16 positioned on the pallet 20 and a 2D depth map image 34 of the top view of the boxes 16 from the camera 24. The images 32 and 34 are provided to a segmentation module 36 that preforms an image segmentation process using a simplified mask R-CNN, where each pixel in a segmented mask is assigned a certain label and where the pixels associated with the same box 16 have the same label.

Figure 3:
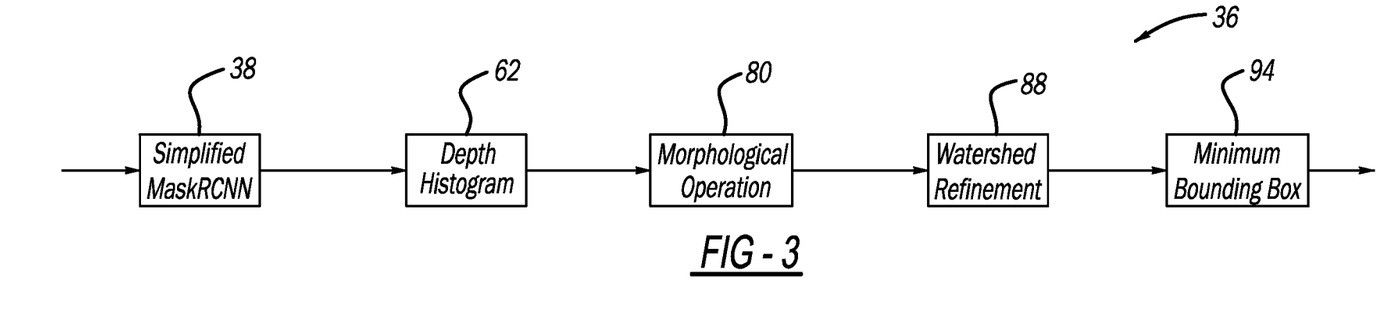
FIG. 3 is a schematic block diagram of a segmentation module separated from the system shown in FIG. 2.
Figure 4:
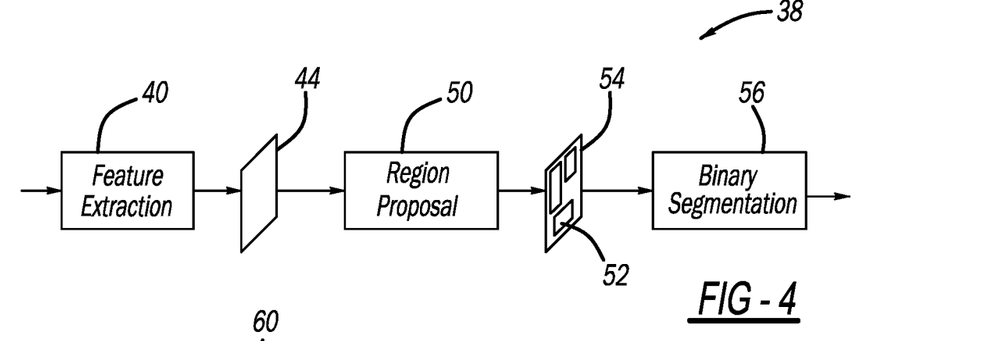
FIG. 4 is a schematic block diagram of a simplified mask R-CNN separated from the system shown in FIG. 3.

FIG. 3 is a schematic block diagram of the module 36 separated from the system 30, where the RBG image 32 and the depth image 34 are provided to a simplified mask R-CNN 38 that operates in the same or a similar manner as the deep learning mask R-CNN in the '817 application. FIG. 4 is a schematic block diagram of the mask R-CNN 38 separated from the module 36. The RGB image 32 is provided to a feature extraction module 40 that performs a filtering process that extracts features from the image 32. For example, the module 40 extracts gradients, edges, contours, elementary shapes, etc. from the image 32, and provides an extracted features image 44 of the RGB image 32. The features image 44 is provided to a region proposal module 50 that uses the mask R-CNN 38 to analyze the identified features in the features image 44 to predict the location of the boxes 16 in the image 44. Particularly, the module 50 provides a number of bounding boxes, such as 50 to 100 boxes, of different sizes, i.e., boxes having various lengths and widths, that are used to identify the probability that a box 16 exists at a certain location in the image 44. The region proposal module 50 employs a sliding search window template, well known to those skilled in the art, where a search window including all of the bounding boxes is moved over the features image 44, for example, from a top left of the image 44 to a bottom right of the image 44, to look for features that identify the probable existence of one of the boxes 16 in the image 44.

Figure 5:
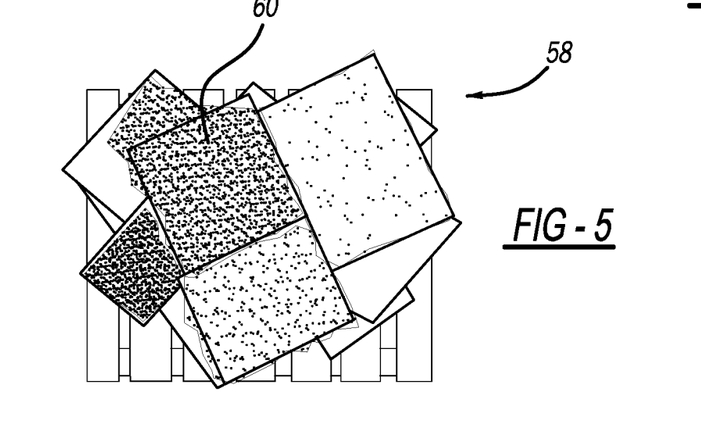
FIG. 5 is a segmentation mask image produced by the mask R-CNN shown in FIG. 4.

The sliding window search produces a bounding box mask image 54 including a number of bounding boxes 52 that each surrounds a predicted box in the image 44, where the number of the bounding boxes 52 in the mask image 54 may be reduced each time the robot 12 removes one of the boxes 16 from the stack 18. The module 50 parameterizes a center location (x, y), width (w) and height (h) of each box 52 and provides a prediction confidence value between 0% and 100% that each bounding box 52 covers a box 16 in the image 32. The mask image 54 is provided to a binary segmentation module 56 that estimates using the mask R-CNN 38 whether each pixel belongs to a box 16 in each of the bounding boxes 52 to eliminate pixels in the box 52 that do not cover a box 16 in the image 32. The remaining pixels in the mask image 54 in each of the boxes 52 are assigned a value for a particular box 16 so that a 2D segmentation mask image 58, see FIG. 5, is generated that includes a plurality of masks 60 that predict the location of the boxes 16 in the image 32, where each mask 60 has a different indicia, such as color. The algorithm then selects one of the masks 60 in the mask image 58 that has a high confidence value or probability that it covers a box 16.

Because the simplified mask R-CNN 38 is a lower complexity neural network than the deep learning mask R-CNN employed in the '817 application, the different color masks in the mask image 58 generally will not follow the size of the boxes 16 accurately enough for the robot 12 to pick the box 16 up at the best location and orientation. In other words, the accuracy of the mask R-CNN 38 to detect the edges of the boxes 16 is reduced, but the ability of the mask R-CNN to detect the center area of the boxes 16 is satisfactory. Thus, further refinement of the size of the selected mask 60 is necessary to closely match the selected mask 60 to the size of the box 16 it is masking. As a first refinement step, the algorithm determines if the selected mask 60 includes pixels of a box on a top layer and part of a box on a lower layer, see, for example, the mask 60, using the depth map image 34, and if so, removes the lower layer pixels from the selected mask 60. The selected mask 60 is sent to a depth histogram module 62 that removes the pixels in the mask 60 that are not in a top layer of the image 32.

Figure 6:
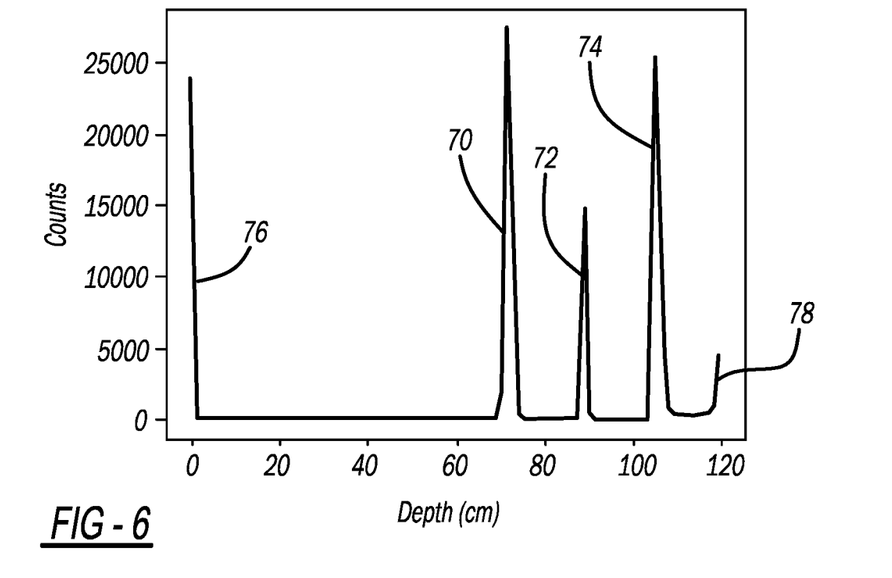
FIG. 6 is a histogram graph with depth on the horizontal axis and counts on the vertical axis showing count peaks of boxes in the stack.

FIG. 6 is an illustration of a depth histogram with depth on the horizontal axis and counts on the vertical axis, where a separate "bar" is defined, for example, every centimeter of depth from the camera 24. Each pixel in the depth map image 34 is assigned a value depending on its distance from the camera 24, and each pixel in the depth map image 34 is a count and each count is assigned to a bar depending on its value. Therefore, the pixels for the boxes 16 in a particular layer will be assigned to the same bar or surrounding bars. The histogram shows a peak 70 of the counts for a top layer at a depth of 70 cm, a peak 72 of the counts for a middle layer at a depth of 90 cm, and a peak 74 of the counts for a bottom layer at a depth of 105 cm, where a peak 76 at zero cm from the camera 24 includes counts from pixels that cannot be measured and are dismissed and a peak 78 at 120 cm from the camera 24 is the ground and is also dismissed. Therefore, pixels in the mask 60 that are not in the peak 70 are removed and a refined mask 64 is provided as shown in a refined mask image 66 in FIG. 7.

Figures 7, 8:
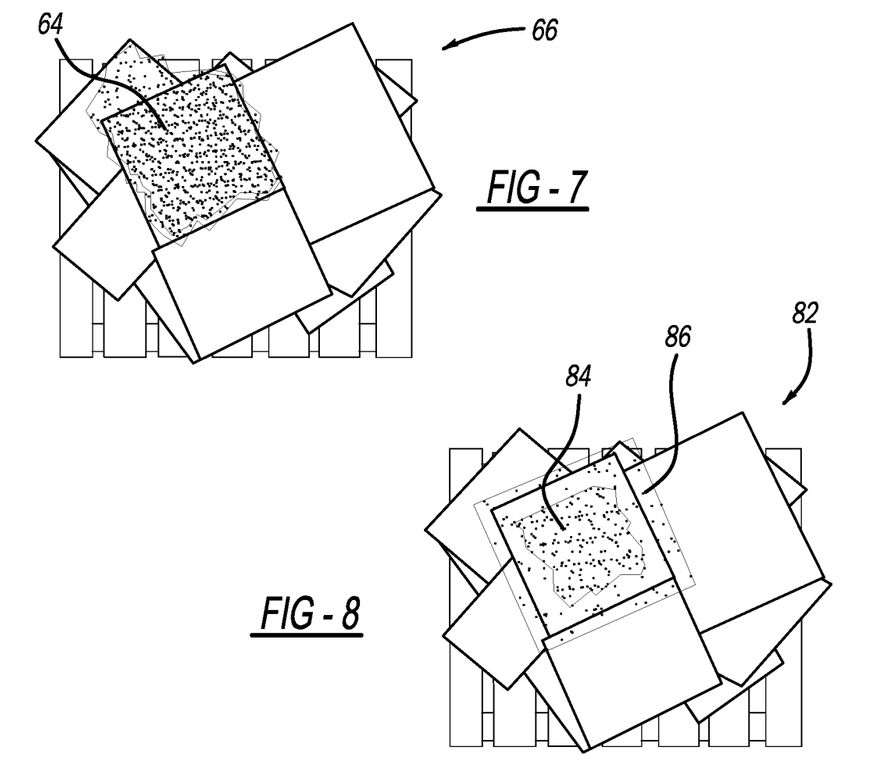
FIG. 7 is a mask image including a refined mask with lower pixels removed.
FIG. 8 is a mask image including upper and lower boundary masks.

The refined mask 64 still does not predict the boundaries of the selected box 16 in the top layer accurately enough. Therefore, the refined mask 64 is sent to a morphological operation module 80 that calculates upper and lower boundaries of the mask 64, where the boundary of the box 16 that the mask 64 is covering would be between the upper and lower boundaries. More specifically, the algorithm performs a dilation process where a predetermined number of pixels are added to the outer bound of the refined mask 64 and an erosion process where a predetermined number of pixels are removed from the outer bound of the refined mask 64. This is illustrated in FIG. 8 showing an image 82 where the mask 64 has been converted to a lower boundary refined mask 84 and an upper boundary refined mask 86.

Figure 9:
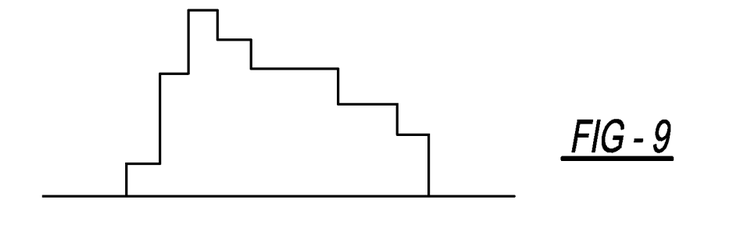
FIG. 9 is an initial image of the upper boundary mask where each pixel's value in the initial image is a light intensity.
Figure 10:
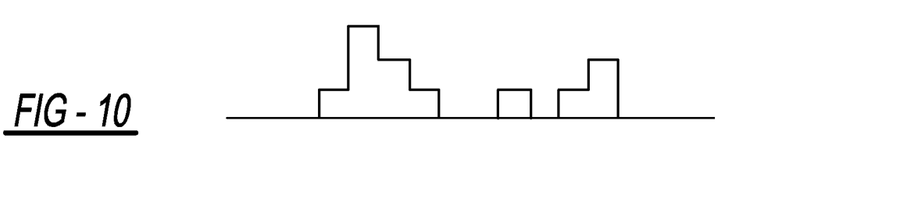
FIG. 10 is a gradient image of the initial image shown in FIG. 9.
Figure 11A:
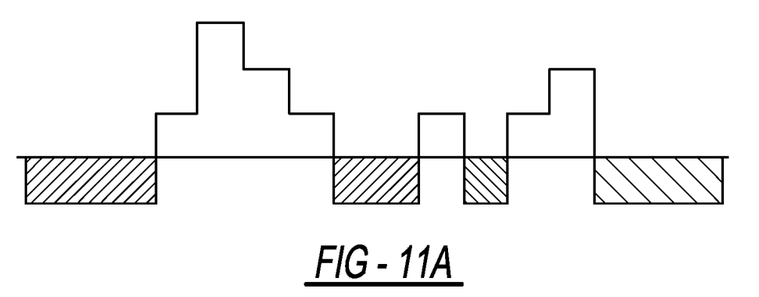
FIGS. 11A-11E show the gradient image with the areas surrounding the gradient peaks being filled up.
Figure 11B:
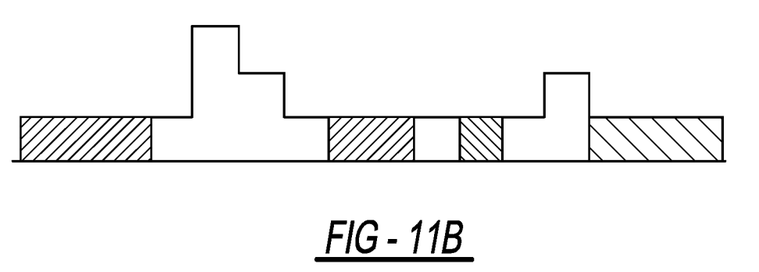
Figure 11C:
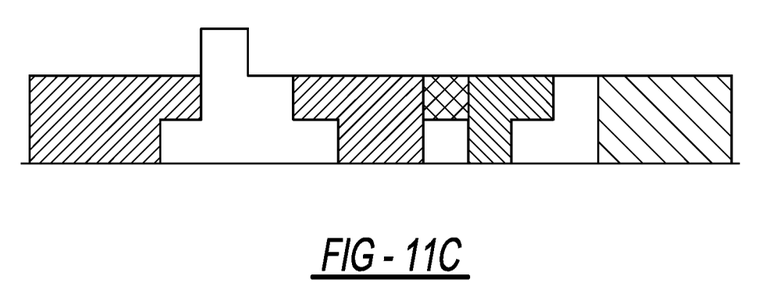
Figure 11D:
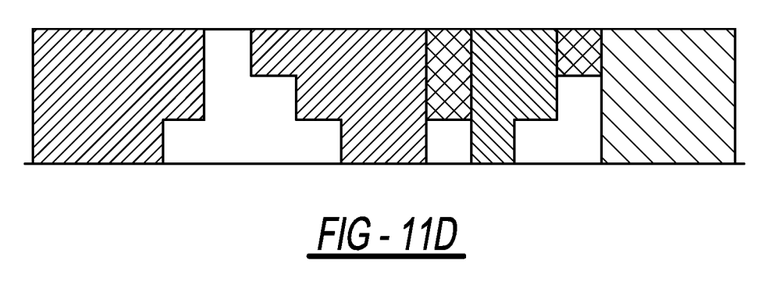
Figure 11E:
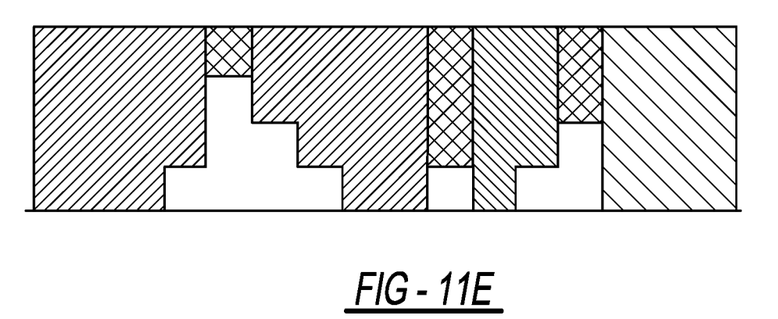

The refined masks 84 and 86 are provided to a refinement module 88 that employs a refinement process to determine the actual boundary of the box 16 that the mask 64 is covering. This process first includes generating an initial image, as shown in FIG. 9, which is a cropped image of the RBG image 32 that only includes the region of the image 32 defined by the upper boundary mask 86 and where each pixel's value in the initial image is a light intensity. A gradient operation is then performed on the initial image to get a gradient image as shown in FIG. 10, where the gradient image has the same shape as the initial image, but where each pixel intensity is replaced with a gradient intensity. More particularly, for each pixel in the initial image the process identifies the intensity of its neighbor pixels, i.e., its up, down, right and left pixels. The horizontal gradient Gx of the pixel is determined by its right pixel intensity minus its left pixel intensity and the vertical gradient Gy of the pixel is determined by its up pixel intensity minus its down pixel intensity. The gradient of the pixel is then calculated as the square root of $Gx^2+Gy^2$. Therefore, those areas in the RBG image 32 that have a large color or intensity change will have a larger gradient and will have a high probability of being a boundary of the box 16 being covered by the mask 64.

Figure 12:
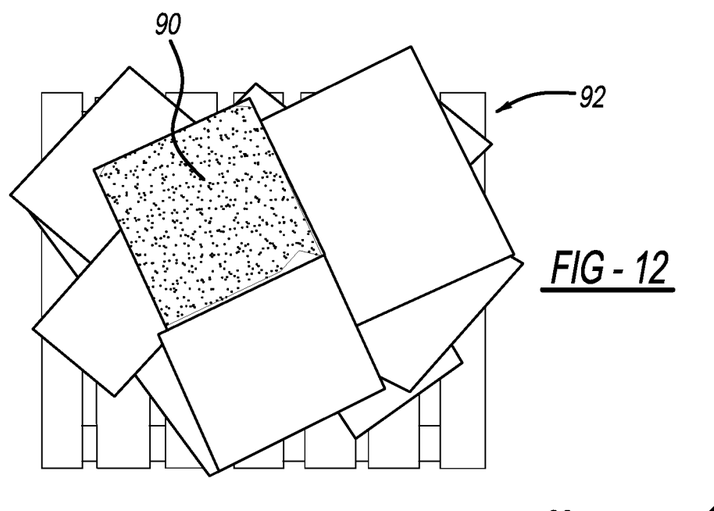
FIG. 12 is an expanded mask image including an expanded mask.

The pixels in the gradient image are then given values to simulate a process where one water source introduces water into the lower boundary mask 84 and another water source introduces water outside of the upper boundary mask 86. As water fills in the lower areas on both sides of the peak gradient pixels that presumably define the boundary of the box 16 that the mask 64 is covering, the water from the two sources will eventually touch at the gradient peaks, which will be marked as the boundary pixels. For example, the pixels outside of the upper boundary mask 86 are assigned a pixel value of zero, and then a dilation process is performed where the intensity of the pixel values are increased to expand the pixels values into the mask 86. Similarly, the pixels in the lower boundary mask 84 are assigned a pixel value of one, and then a dilation process is performed where the intensity of the pixel values are increased to expand the pixels values into the upper boundary mask 86. This process is illustrated in FIGS. 11A-11E each showing the gradient image with the areas surrounding the gradient peaks being filled up. Once the boundary pixels are identified, an expanded mask 90 is generated as shown in an expanded mask image 92 in FIG. 12.

Figure 13:
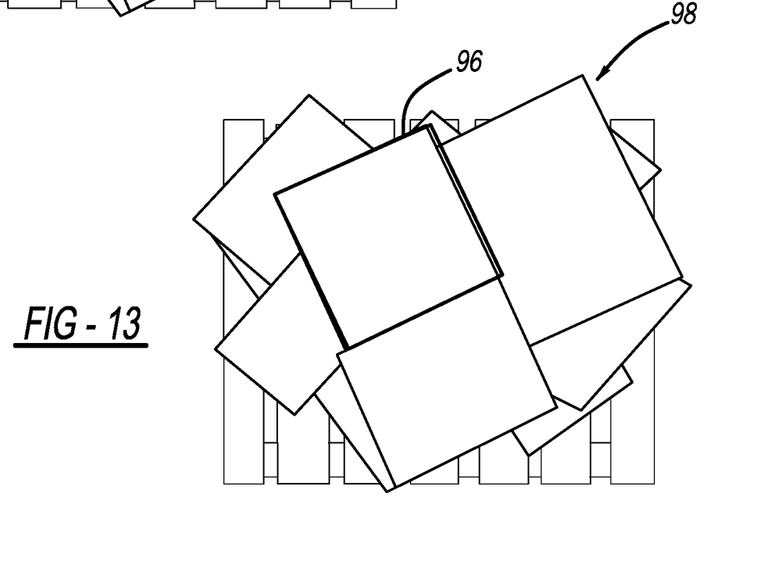
FIG. 13 is a bounding box image generated from the expanded mask image showing a minimum bounding box.

The expanded mask 90 is then sent to a minimum bounding box module 94 that determines the orientation angle (θ) of the expanded mask 90, and thus the orientation angle of the box 16 it is covering, which allows the robot 12 to turn the box 16 after it is picked up a desired amount based on that angle. More particularly, the module 94 rotates a bounding box around the expanded mask 90 and decreases its size using an iterative minimum rectangle search to obtain a smallest size bounding box that surrounds the mask 90, such as minimum bounding box 96 as shown in a bounding box image 98 in FIG. 13.

Returning to FIG. 2, the x-y coordinates of the pixels within the minimum bounding box 96 are then provided to a center pixel module 100 that determines the center of the minimum bounding box 96. The x-y coordinates of the center pixel are provided to a Cartesian coordinate module 102 along with the depth map image 34 that calculates the x-y-z Cartesian coordinates of the center pixel of the minimum bounding box 96, where the depth map image 34 knows each pixels location in the real world. The x-y-z coordinate of the center pixel for the minimum bounding box 96 is then used to identify the x-y-z grasp position in a grasp position module 104 for positioning the end-effector 14. The grasp position of the end-effector 14 and a known vertical orientation of the box 16 from a vertical orientation module 106 determines the grasp pose or orientation of the end-effector 14 in a grasp pose module 108, where the grasp pose includes the x-y-z coordinates and the yaw, pitch and roll of the end-effector 14 to provide the approach orientation to the box 16 of the end-effector 14, and where other orientations of the boxes 16 can be provided, such as a normal orientation of a box surface, instead of the vertical orientation. The robot motion is performed at a pick-up module 110 to pick up the box 16. Once the box 16 is picked up, an object rotation module 112 that receives the rotation parameter 8 from the segmentation module 36 causes the robot 12 to rotate the box 16 the desired amount determined by the rotation parameter 8 in all of the x-y-z directions so as to, for example, properly align the box 16 on the conveyor belt 22. The robot 12 then signals the camera 24 to provide new RGB and depth map images, where the previously picked-up box 16 has been removed from the stack 18. This process is continued until all of the boxes 16 have been picked up by the robot 12 and placed on the conveyor belt 22.

Figure 14:
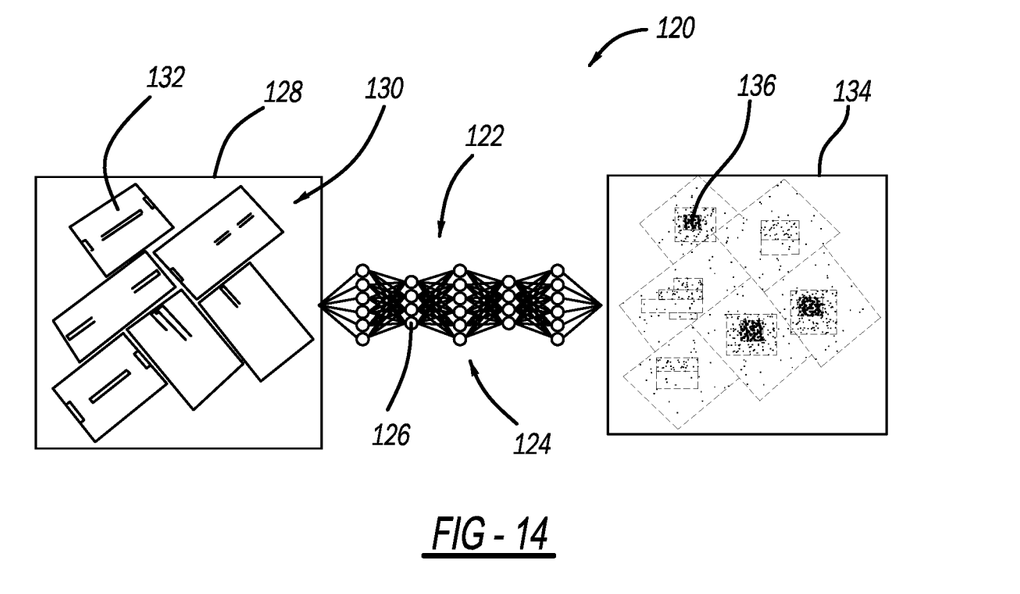
FIG. 14 is a block diagram of a segmentation system for detecting a center area of objects in a group of objects using a deep learning neural network.

As mentioned above, the simplified mask R-CNN 38 is able to accurately predict a center area of the boxes 16, but is not able to accurately predict the edges of the boxes 16. This is illustrated in FIG. 14 that shows a block diagram of an image segmentation system 120. The system 120 includes a deep learning neural network 122 having layers 124 with nodes 126 that receives an RBG image 128 of a group 130 of boxes 132, where the neural network 122 may be a mask R-CNN or other type of deep learning neural network. The neural network 122 generates a segmentation image 134 in the manner described above, or otherwise, that includes an accurate depiction of a center area 136 of the boxes 132, where the segmentation image 134 would be similar to the segmentation image 58. It is noted that the general operation as described is not limited to predicting the location of boxes, but can be used to predict the location of any suitable object from a group of objects.

Figure 15:
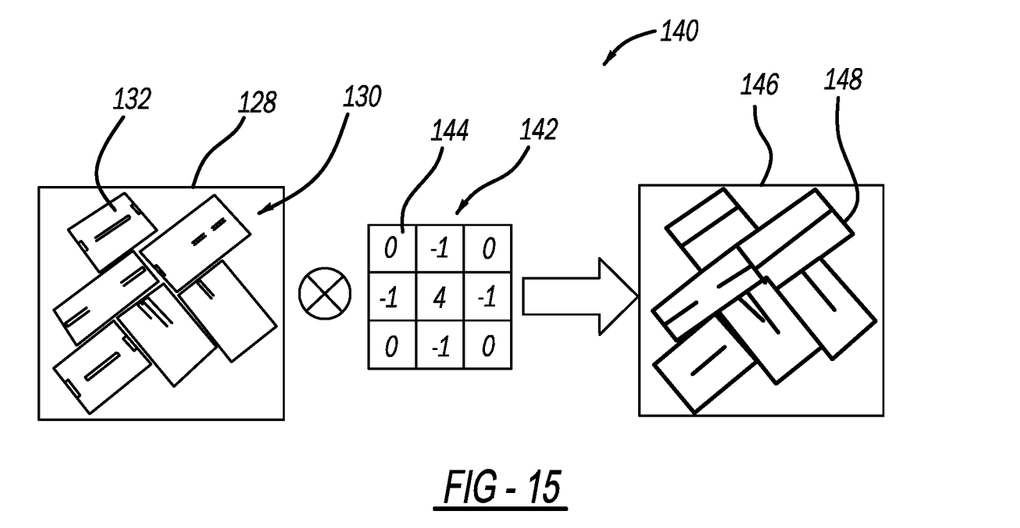
FIG. 15 is a block diagram of a segmentation system for detecting edges of objects in a group of objects using a traditional segmentation process.

The discussion above employed a "traditional" technique using the modules 62, 80, 88 and 94 to accurately determine the edges of the boxes 16 in the segmentation image 58 using the accurate prediction of the center area of the boxes 16 provided by the simplified mask R-CNN 38. However, other traditional techniques can also be employed to predict the edges of the boxes 16. This is generally illustrated in FIG. 15 that shows a block diagram of a traditional system 140 that is able to identify edges of the boxes 132 in the RGB image 128. In this non-limiting embodiment, a pixel-by-pixel multiplication process is performed using a sliding matrix 142 of nine boxes 144 to determine an intensity value of a center box in the matrix 142, here having an intensity value of 4, which is a certain one of the pixels in the image 128. The value of the center box in a horizontal direction is determined by subtracting the value of the left and right boxes to obtain an average value. Likewise, the value of the center box in a vertical direction is determined by subtracting the value of the top and bottom kernels to obtain an average value. The matrix 142 will be slid over the image 128 so that the intensity value of each pixel in the image 128 is determined in this manner, where high intensity pixels may be edges of the boxes 132. This will produce an edge image 146 where possible edges of the boxes 132 are shown by high intensity lines 148. Therefore, if the segmentation image 134 is the input to the system 140, the high intensity lines around the center areas 136 can be identified as the edges of the box 132 associated with the particular center area 136.

As will be well understood by those skilled in the art, the several and various steps and processes discussed herein to describe the disclosure may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for picking up an object box from a group of object boxes, said method comprising:
   obtaining a 2D red-green-blue (RGB) color image of the boxes using a 3D camera;
   obtaining a 2D depth map image of the boxes using the 3D camera, where pixels in the depth map image are assigned a value identifying the distance from the camera to the boxes;
   generating a segmentation mask image of the boxes by performing an image segmentation process in a neural network, said image segmentation process extracting features from the RGB image and using the extracted features to predict which pixels in the RGB image are associated with each box, where the pixels associated with each box are assigned a unique label that combine to define a mask for the box;
   selecting one of the masks in the segmentation mask image;
   identifying and removing pixels in the selected mask that may be associated with a lower object box than the object box associated with the selected mask to provide a refined mask;
   generating a lower boundary mask and an upper boundary mask from the refined mask using a morphological process;
   generating an expanded mask from the lower boundary mask and the upper boundary mask using a refinement process, wherein generating an expanded mask includes generating an initial image that only includes the region of the RBG image defined by the upper boundary mask where each pixel's value in the initial image is a light intensity, then generating a gradient image from the initial image where each pixel intensity is replaced with a gradient intensity based on neighbor pixels, and then dilating the pixel intensities to identify peaks in the gradient image; and
   identifying a location for picking up the box using the expanded mask.

2. The method according to claim 1 wherein the neural network is a simplified mask R-CNN (convolutional neural network).

3. The method according to claim 1 wherein generating a segmentation mask image includes providing a plurality of bounding boxes, aligning the bounding boxes to the extracted features and providing a bounding box image that includes bounding boxes surrounding the object boxes.

4. The method according to claim 3 wherein generating a segmentation mask image includes determining the probability that an object box exists in each bounding box.

5. The method according to claim 3 wherein generating a segmentation mask image includes removing pixels from each bounding box in the bounding box image that are not associated with an object box.

6. The method according to claim 1 wherein identifying and removing pixels in the selected mask includes using the depth map image.

7. The method according to claim 1 wherein generating a lower boundary mask and an upper boundary mask includes performing a dilation process where a predetermined number of pixels are added to an outer boundary of the refined mask and an erosion process where a predetermined number of pixels are removed from the outer boundary of the refined mask.

8. The method according to claim 1 further comprising determining an orientation angle ($\theta$) of the expanded mask by fitting a minimum size bounding box around the expanded mask.

9. The method according to claim 8 wherein fitting a minimum size bounding box around the expanded mask includes using an iterative minimum rectangle search to obtain a smallest size bounding box that surrounds the expanded mask.

10. The method according to claim 1 wherein identifying a location for picking up the object box includes identifying a center pixel of final boundary mask and calculating x-y-z coordinates of the center pixel using the location of the center pixel and the depth map image.

11. The method according to claim 10 wherein identifying a location for picking up the object box includes determining a grasp pose for picking up the object box using the x-y-z coordinates and a pitch, yaw and roll position.

12. The method according to claim 11 wherein the object box is picked up by a robot and the grasp pose determines the pose of a robot end-effector.

13. A method for selecting an object from a group of objects, said method comprising:
   obtaining a 2D red-green-blue (RGB) color image of the objects using a 3D camera;
   generating a segmentation mask image of the objects by performing an image segmentation process in a neural network, said image segmentation process extracting features from the RGB image and using the extracted features to predict which pixels in the RGB image are associated with each object, where the pixels associated with each object are assigned a unique label that combine to define a mask for the object;
   selecting one of the masks in the segmentation mask image;
   identifying and removing pixels in the selected mask that may be associated with a lower object than the object associated with the selected mask to provide a refined mask;
   generating a lower boundary mask and an upper boundary mask from the refined mask using a morphological process;
   generating an expanded mask from the lower boundary mask and the upper boundary mask using a refinement process, wherein generating an expanded mask includes generating an initial image that only includes the region of the RBG image defined by the upper boundary mask where each pixel's value in the initial image is a light intensity, then generating a gradient image from the initial image where each pixel intensity is replaced with a gradient intensity based on neighbor pixels, and then dilating the pixel intensities to identify peaks in the gradient image; and
   identifying a location of the object using the expanded mask.

14. The method according to claim 13 wherein the neural network is a simplified mask R-CNN (convolutional neural network).

15. The method according to claim 13 wherein generating a segmentation mask image includes providing a plurality of bounding boxes, aligning the bounding boxes to the extracted features and providing a bounding box image that includes bounding boxes surrounding the objects.

16. The method according to claim 15 wherein generating a segmentation mask image includes determining the probability that an object exists in each bounding box.

17. The method according to claim 15 wherein generating a segmentation mask image includes removing pixels from each bounding box in the bounding box image that are not associated with an object.

18. The method according to claim 13 wherein identifying and removing pixels in the selected mask includes using a depth map image.

19. The method according to claim 13 wherein generating a lower boundary mask and an upper boundary mask includes performing a dilation process where a predetermined number of pixels are added to an outer boundary of the refined mask and an erosion process where a predetermined number of pixels are removed from the outer boundary of the refined mask.

20. The method according to claim 13 further comprising determining an orientation angle (θ) of the expanded mask by fitting a minimum size bounding box around the expanded mask.

21. The method according to claim 20 wherein fitting a minimum size bounding box around the expanded mask includes using an iterative minimum rectangle search to obtain a smallest size bounding box that surrounds the expanded mask.

22. A system for picking up an object box from a group of object boxes, said system comprising:
   means for obtaining a 2D red-green-blue (RGB) color image of the boxes using a 3D camera;
   means for obtaining a 2D depth map image of the boxes using the 3D camera, where pixels in the depth map image are assigned a value identifying the distance from the camera to the boxes;
   means for generating a segmentation mask image of the boxes by performing an image segmentation process in a neural network, said image segmentation process extracting features from the RGB image and using the extracted features to predict which pixels in the RGB image are associated with each box, where the pixels associated with each box are assigned a unique label that combine to define a mask for the box;
   means for selecting one of the masks in the segmentation mask image;
   means for identifying and removing pixels in the selected mask that may be associated with a lower object box than the object box associated with the selected mask to provide a refined mask;
   means for generating a lower boundary mask and an upper boundary mask from the refined mask using a morphological process;
   means for generating an expanded mask from the lower boundary mask and the upper boundary mask using a refinement process, wherein the means for generating an expanded mask generates an initial image that only includes the region of the RBG image defined by the upper boundary mask where each pixel's value in the initial image is a light intensity, then generating a gradient image from the initial image where each pixel intensity is replaced with a gradient intensity based on neighbor pixels, and then dilating the pixel intensities to identify peaks in the gradient image; and
   means for identifying a location for picking up the box using the expanded mask.

23. The method according to claim 1 wherein the lower boundary mask is smaller and includes less pixels than the refined mask and the upper boundary mask is larger and includes more pixels than the refined mask.

24. The method according to claim 13 wherein the lower boundary mask is smaller and includes less pixels than the refined mask and the upper boundary mask is larger and includes more pixels than the refined mask.

25. The system according to claim 22 wherein the lower boundary mask is smaller and includes less pixels than the refined mask and the upper boundary mask is larger and includes more pixels than the refined mask.

* * * * *